(12) United States Patent
Pratt

(10) Patent No.: US 10,352,044 B2
(45) Date of Patent: Jul. 16, 2019

(54) JOINT-FREE CONCRETE

(71) Applicant: HUGHES GENERAL CONTRACTORS, INC., North Salt Lake, UT (US)

(72) Inventor: Daniel J. Pratt, Farmington, UT (US)

(73) Assignee: HUGHES GENERAL CONTRACTORS, INC., North Salt Lake, UT (US)

( * ) Notice: Subject to any disclaimer, the term of this patent is extended or adjusted under 35 U.S.C. 154(b) by 0 days.

(21) Appl. No.: 15/912,322

(22) Filed: Mar. 5, 2018

(65) Prior Publication Data

US 2018/0195280 A1      Jul. 12, 2018

Related U.S. Application Data

(63) Continuation-in-part of application No. 15/136,894, filed on Apr. 23, 2016, now Pat. No. 9,909,307.

(Continued)

(51) Int. Cl.
*E04B 5/32* (2006.01)
*E04B 1/66* (2006.01)
(Continued)

(52) U.S. Cl.
CPC .............. *E04B 5/32* (2013.01); *C04B 14/42* (2013.01); *C04B 14/48* (2013.01); *C04B 16/06* (2013.01);
(Continued)

(58) Field of Classification Search
CPC ........ E04B 5/32; E04B 1/665; E04B 2103/02; C04B 18/02; C04B 16/06; C04B 16/12;
(Continued)

(56) References Cited

U.S. PATENT DOCUMENTS 2,590,685 A * 3/1952 Coff ...................... B28B 23/046
                                                                404/70
2,899,771 A * 8/1959 Burris, Jr. ............ A01M 1/245
                                                                428/907

(Continued)

OTHER PUBLICATIONS

Office Action cited in U.S. Appl. No. 15/136,894 dated May 18, 2017.

(Continued)

*Primary Examiner* — Patrick J Maestri
*Assistant Examiner* — Joseph J. Sadlon
(74) *Attorney, Agent, or Firm* — Workman Nydegger

(57) ABSTRACT

Method of forming a concrete slab to reduce or eliminate control joints includes preparing a substantially flat base, overlaying one or more barriers on top of the base, placing a concrete mixture on top of the barrier(s) and base to form a concrete slab, and allowing the concrete to cure without forming control joints. The base is prepared with a flatness of about ±¼ inch over 10 feet. A side edge is prepared along a periphery of the concrete slab by extending a vapor barrier from a bottom surface of the slab up the side edge toward a top surface of the slab and covering the side edge. A plurality of post-tensioning cables are positioned to extend through the slab and configured to compress and assist in controlling accelerated displacement of the concrete slab during curing and shrinkage. The concrete slab is formed of an evenly gradated and low slump concrete having high fiber content, minimized cement content, and maximized size of large aggregate.

24 Claims, 10 Drawing Sheets

Related U.S. Application Data

(60) Provisional application No. 62/151,937, filed on Apr. 23, 2015.

(51) Int. Cl.

| | | |
|---|---|---|
| *E04C 5/06* | (2006.01) | |
| *E04C 5/08* | (2006.01) | |
| *C04B 18/02* | (2006.01) | |
| *C04B 14/48* | (2006.01) | |
| *C04B 14/42* | (2006.01) | |
| *C04B 16/06* | (2006.01) | |
| *C04B 16/12* | (2006.01) | |
| *C04B 28/04* | (2006.01) | |
| *E04C 5/01* | (2006.01) | |
| *E04C 5/07* | (2006.01) | |
| *C04B 111/00* | (2006.01) | |
| *C04B 111/34* | (2006.01) | |

(52) U.S. Cl.
CPC .............. *C04B 16/12* (2013.01); *C04B 18/02* (2013.01); *C04B 28/04* (2013.01); *E04B 1/665* (2013.01); *E04C 5/06* (2013.01); *E04C 5/08* (2013.01); *C04B 2111/00612* (2013.01); *C04B 2111/343* (2013.01); *E04B 2103/02* (2013.01); *E04C 5/012* (2013.01); *E04C 5/0645* (2013.01); *E04C 5/073* (2013.01)

(58) Field of Classification Search
CPC . C04B 14/42; C04B 14/48; E04C 5/08; E04C 5/06; E04C 5/012
USPC ............................................. 52/396.04, 223.6
See application file for complete search history.

(56) References Cited

U.S. PATENT DOCUMENTS

| | | | | |
|---|---|---|---|---|
| 3,040,411 A * | 6/1962 | Messenger | ............ | E04B 1/0007 249/20 |
| 3,286,421 A | 11/1966 | Branstrator | | |
| 3,623,288 A * | 11/1971 | Horowitz | ............ | E04B 1/10 52/264 |
| 3,802,492 A | 4/1974 | Hilgemann | | |
| 3,904,193 A | 9/1975 | Patterson | | |
| 3,962,510 A | 6/1976 | Worcester | | |
| 4,015,432 A | 4/1977 | Ball | | |
| 4,041,722 A * | 8/1977 | Terlesky | ............ | F17C 3/022 165/45 |
| 4,144,727 A | 3/1979 | Duhl | | |
| 4,359,845 A * | 11/1982 | Harrison | ............ | E02D 31/02 52/169.6 |
| 4,422,269 A * | 12/1983 | Giard | ............ | E04C 3/34 52/100 |
| 4,615,280 A | 10/1986 | Shoop | | |
| 4,653,237 A * | 3/1987 | Taft | ............ | E04B 5/40 52/334 |
| 4,653,956 A | 3/1987 | Lang | | |
| 4,712,344 A | 12/1987 | Erdei | | |
| 4,744,189 A | 5/1988 | Wilson | | |
| 4,907,386 A * | 3/1990 | Ekroth | ............ | E02D 31/008 52/169.14 |
| 5,111,627 A * | 5/1992 | Brown | ............ | E04F 15/024 52/126.5 |
| 5,113,630 A | 5/1992 | Murray | | |
| 5,337,533 A * | 8/1994 | Kajita | ............ | E04B 1/0007 52/169.14 |
| 5,399,195 A * | 3/1995 | Hansen | ............ | C04B 16/06 106/711 |
| 5,501,048 A * | 3/1996 | Nakanishi | ............ | E04B 1/0007 52/295 |
| 5,763,043 A | 6/1998 | Porter | | |
| 5,803,964 A * | 9/1998 | Scarborough | ............ | E04B 1/161 106/724 |
| 5,868,894 A * | 2/1999 | Frenkel | ............ | C04B 7/22 156/281 |
| 6,122,887 A * | 9/2000 | Massett | ............ | E02D 31/02 52/169.11 |
| 6,280,521 B1 * | 8/2001 | Carter, Jr. | ............ | B09B 1/00 106/724 |
| 6,790,544 B2 * | 9/2004 | Schmitz | ............ | C04B 40/0675 404/34 |
| 6,912,820 B2 * | 7/2005 | Sourlis | ............ | E04B 1/70 52/302.1 |
| 6,942,727 B2 | 9/2005 | Daczko | | |
| 7,024,831 B1 * | 4/2006 | Clark | ............ | E04B 5/046 249/19 |
| 7,565,779 B2 * | 7/2009 | Iske | ............ | E21D 11/381 52/742.13 |
| 7,632,401 B2 * | 12/2009 | Edelmayer | ............ | E03F 5/0407 210/164 |
| 7,735,271 B1 * | 6/2010 | Shipston | ............ | B32B 5/18 52/169.11 |
| 7,753,618 B2 * | 7/2010 | Constantz | ............ | B01D 53/1425 106/638 |
| 8,397,453 B2 | 3/2013 | Shaw | | |
| 8,608,883 B2 * | 12/2013 | Blasdel | ............ | E02D 31/02 156/242 |
| 8,756,890 B2 | 6/2014 | Ciuperca | | |
| 8,844,227 B1 | 9/2014 | Ciuperca | | |
| 8,898,994 B1 * | 12/2014 | Socha | ............ | E04F 15/12 52/403.1 |
| 8,931,228 B2 * | 1/2015 | Wiercinski | ............ | E01D 19/083 52/408 |
| 9,169,643 B2 * | 10/2015 | Dryburgh | ............ | B28B 7/0014 |
| 9,222,268 B1 | 12/2015 | Bracegirdle | | |
| 9,297,158 B2 | 3/2016 | Lundmark | | |
| 9,611,645 B1 * | 4/2017 | Dupray | ............ | E04C 2/06 |
| 9,783,982 B2 | 10/2017 | Dinmore | | |
| 2007/0266658 A1 * | 11/2007 | Lyden | ............ | E02D 31/02 52/292 |
| 2009/0226693 A1 | 9/2009 | Carter | | |
| 2009/0301016 A1 | 12/2009 | Schroer | | |
| 2010/0307093 A1 | 12/2010 | Zielonka | | |
| 2014/0170363 A1 | 6/2014 | Gunther | | |
| 2015/0159386 A1 | 6/2015 | Dinmore | | |
| 2016/0032554 A1 | 2/2016 | Hicks | | |
| 2016/0069068 A1 | 3/2016 | Garcia | | |

OTHER PUBLICATIONS

Notice of Allowance cited in U.S. Appl. No. 15/136,894 dated Oct. 30, 2017.

Office Action cited in U.S. Appl. No. 15/912,261 dated May 3, 2018.

\* cited by examiner

JOINT-FREE CONCRETE

CROSS-REFERENCE TO RELATED APPLICATIONS

This Application is a continuation-in-part of U.S. patent application Ser. No. 15/136,894, filed Apr. 23, 2016, which claims the benefit of U.S. Provisional Patent Application No. 62/151,937, filed Apr. 23, 2015, the disclosures of which are incorporated herein by reference in their entirety.

BACKGROUND

The present disclosure relates to concrete slabs and methods of placing concrete slabs so as to control and mitigate undesirable properties during the concrete curing process.

Current placing methods for concrete slabs, particularly exposed and polished concrete floors in industrial and/or commercial applications, are intended to provide an aesthetically appealing surface that maintains desirable characteristics of polished concrete slabs, including relatively high compressive strength, high durability, low permeability, and low maintenance requirement. At the same time, beneficial placing methods attempt to mitigate undesirable properties of concrete slabs, such as shrinkage and low tensile strength, which create a propensity of the concrete to crack and/or curl during the curing process, and an ongoing tendency of concrete to transmit moisture vapor from surrounding exterior environments.

Conventional mitigation techniques for controlling cracking and curling of finished concrete surfaces generally involve the use of various mix designs, embedding "active" or "passive" reinforcement into the concrete slab, and liberal use of saw cutting to form control joints. The use of saw cutting to form control joints in the surface of the slab during the curing process is done in an effort to contain the cracking to predetermined control joint locations. As a result, however, the control joints themselves present significant maintenance and aesthetic challenges, which must either be dealt with as an ongoing maintenance issue, or treated with caulking or other materials meant to fill the control joints after curing to provide a smoother and less maintenance intensive surface. However, the application of caulk or other filler to the control joints can also create aesthetic and maintenance problems, which themselves detract from the desirability and performance of exposed concrete floors.

Accordingly, there is an ongoing need for improved concrete slabs and methods of preparing concrete slabs. Such methods should provide concrete slabs that avoid the aesthetic and functional limitations of present concrete slabs resulting from saw joint formation, filling, and/or maintenance. At least some of the embodiments of the present disclosure are directed toward these objectives.

BRIEF SUMMARY

Certain embodiments of the present disclosure can reduce or eliminate the need for cutting control joints in exposed concrete slabs, and significantly reduce or eliminate the occurrences of cracking or curling, thereby reducing or eliminating the major aesthetic and maintenance challenges associated with exposed concrete slabs and control joints.

Certain embodiments include: (1) preparing a base to have a substantially flat surface; (2) overlaying one or more barriers on top of the base; (3) placing a fresh concrete mixture on top of the one or more barriers and the base; and (4) allowing the concrete mixture to cure and form a solid concrete slab. In certain embodiments, the base can have a substantially flat surface with a height difference that is ±about 1 inch or less, or ±about ¾ inch or less, or ±about ½ inch or less, or ±about ¼ inch or less over a 10 foot length.

In certain embodiments, the one or more barriers can include a vapor barrier and one or more slip sheets disposed on top of the vapor barrier between the vapor barrier and the concrete slab. As described in more detail below, the base may be formed of aggregate material, such as conventional "roadbase" aggregate materials known in the art. As used herein, unless specifically stated otherwise, a "base formed of aggregate material" omits or limits any cementitious binder that causes the base to form a cured material with a compressive strength of no greater than 1,000 psi, or no greater than 500 psi, or no greater than 300 psi. Typically, no amount of cementitious binder is intentionally added at all, even if roadbase has some degree of self-binding properties (such as what may be provided by clay particles, lime, and/or pozzolanic materials).

In certain embodiments, the concrete is allowed to cure without forming any control joints in the concrete. In other embodiments, the concrete is allowed to cure without forming any control joints closer than about 25 feet to any other control joint, or closer than about 30 feet to any other control joint, or closer than about 40 feet to any other control joint, or closer than about 50 feet to any other control joint (e.g., any other non-intersecting control joint), or closer than about 100 feet to any other control joint, or closer than about 200 feet to any other control joint, or closer than about 300 feet to any other control joint, or closer than about 400 feet to any other control joint, or closer than about 500 feet to any other control joint. In other embodiments, a minimal amount of jointing may be used where elimination of all joints is not practical and/or where jointing may be used to facilitate the size of the concrete pour by locating joints at strategic locations. In other embodiments, periodic joints may be placed to improve slab displacement and/or to facilitate increasing the size of continuous slab placement. In certain embodiments, for example, one or more joints may be minimally and/or strategically placed without requiring a repeating pattern or grid layout.

In some embodiments, the concrete includes at least one section that extends in at least one direction, without interruption by a control joint, for at least about 25 feet, or at least about 30 feet, or at least about 40 feet, or at least about 50 feet, or at least about 100 feet, or at least about 200 feet, or at least about 300 feet, or at least about 400 feet, or at least about 500 feet.

Certain embodiments include preparing a side edge along a periphery of the concrete slab by extending the vapor barrier from a bottom surface of the concrete slab up the side edge toward a top surface of the concrete slab, and covering the side edge of the slab to seal the side edge with the vapor barrier.

Certain embodiments include positioning a plurality of post-tensioning cables so as to extend through the concrete slab from a first end of the concrete slab to a second end of the concrete slab, the post-tensioning cables being configured to provide external compressive forces to the concrete slab to provide accelerated and controlled movement and/or contraction of the concrete slab during shrinkage of the slab.

Certain embodiments include a concrete slab formed from a concrete mix having about 4 to about 7 bags (with one bag being about 94 pounds) of cement (e.g., Portland cement) per cubic yard of concrete (or about 376 to about 658 pounds per cubic yard), or about 5 to about 6 bags (or about 470 to about 564 pounds) of cement per cubic yard of concrete, or about 5.5 bags (or about 517 pounds) of cement per cubic yard of concrete.

Certain embodiments include a concrete slab formed from concrete having a fiber component in an amount that is about 1.5 to about 3 times the level recommended as a rebar replacement, or about 1.75 to about 2.5 times the level recommended as a rebar replacement, or about 2 times the level recommended as a rebar replacement.

Certain embodiments include a concrete slab formed from concrete having a maximum aggregate size of at least about 1.0 inch, or at least about 1.25 inch, or at least about 1.5 inch, and including at least four or more sizes and/or types of aggregate, inclusive of fine aggregate (e.g., sand).

Certain embodiments include a concrete slab formed from concrete having a slump prior to admixtures of about 3 to 5 inches and/or a slump after the addition of one or more admixtures of about 4 to 7 inches.

Certain embodiments include provisions for one or more passages in the concrete slab, the one or more passages configured to allow passage of an extension through the concrete slab, the passages being lined with a compressible material configured to allow movement of the concrete slab relative to the extension. In some embodiments, the compressible material can provide a partial or substantial vapor barrier.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only illustrated embodiments of the disclosure and are therefore not to be considered limiting of its scope. Embodiments of the disclosure will be described and explained with additional specificity and detail through the use of the accompanying drawings in which.

DETAILED DESCRIPTION

As used herein, the term "joint-free concrete slab" and similar terms refer to concrete slabs that minimize or substantially eliminate the need for control joints to prevent substantial cracking of the concrete slab. In some embodiments, a joint-free slab is free of any control joints. In other embodiments, a joint-free slab is formed without any control joints closer than about 25 feet, or closer than about 30 feet, or closer than about 40 feet, or closer than about 50 feet, or closer than about 100 feet, or closer than about 200 feet, or closer than about 300 feet, or closer than about 400 feet, or closer than about 500 feet, to any other non-intersecting control joint. In some embodiments, a concrete slab is formed such that at least one section extends in at least one direction, without interruption by any control joints, for at least about 25 feet, 30 feet, 40 feet, 50 feet, 100 feet, 200 feet, 300 feet, 400 feet, or 500 feet.

Figure 1:
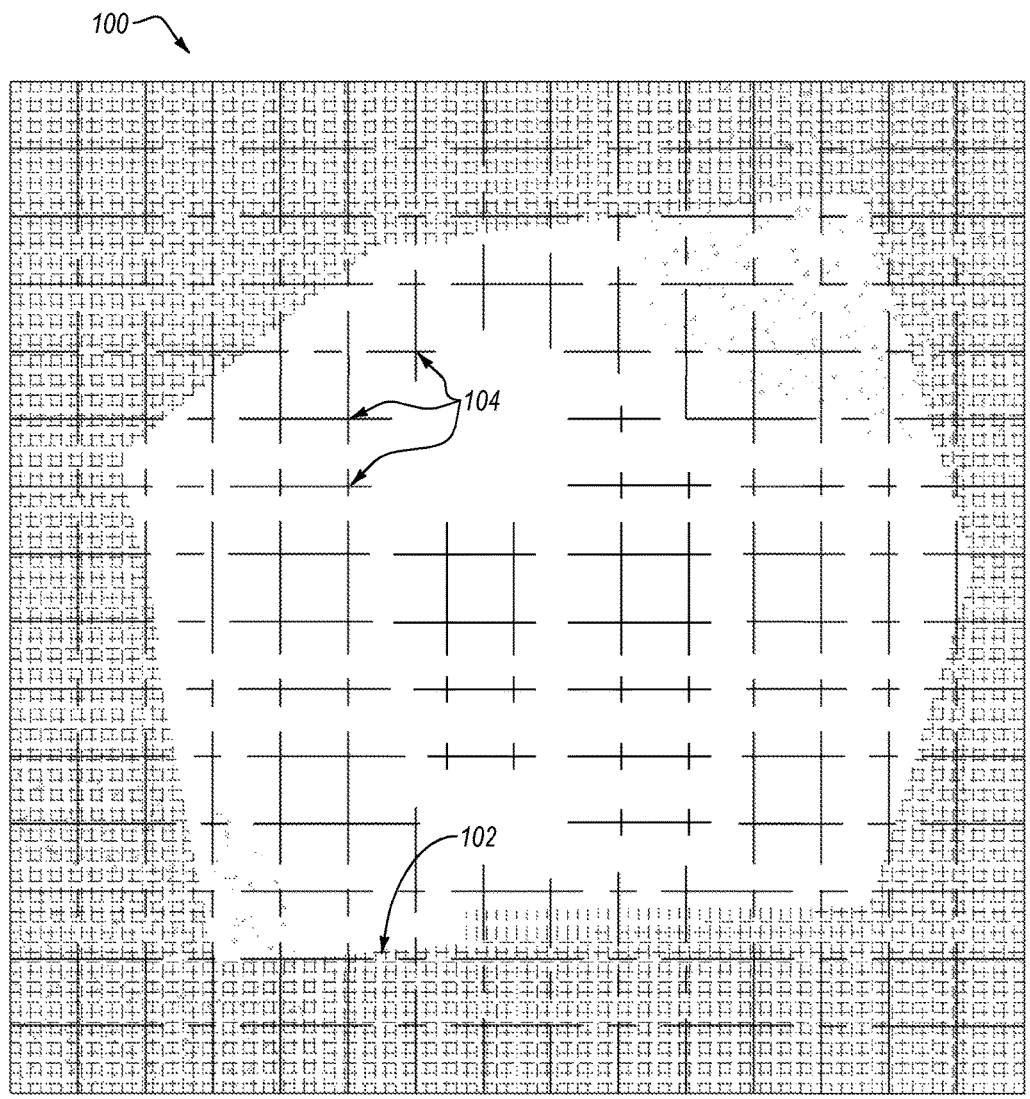
FIG. 1 illustrates a typical concrete slab formed with a large concentration of control joints.

FIG. 1 illustrates a conventional concrete slab design. As illustrated, a conventional concrete slab 100 is formed with a grid of rebar 102 spaced about 18 inches apart and running in both planar directions for reinforcement. During concrete curing, control joints 104 are typically cut across the concrete slab in both planar directions at about every 8-12 feet (typically depending on the thickness of the slab) and about ⅓ of the way through the slab. This creates a weakened plane that defines where shrinkage cracking will be most likely to occur. For a conventional 6 inch thick slab, control joints are typically cut every 12 feet, resulting in a finished surface of 12 foot by 12 foot sections defined by the control joints. The control joints are intended to prevent cracks from forming in other sections of the concrete slab and providing a designated crack location. However, the control joints provide their own problems, such as gaps that collect dirt and other debris and necessitate ongoing cleaning and maintenance of the concrete slab, as well as being generally unsightly and often aesthetically undesirable.

In addition, edges of the concrete slab sections formed by control joints are subject to chipping, breaking, crumbling, and other wear, both during saw cutting and during extended use of the concrete slab, further detracting from the desired aesthetic of the concrete floor. Control joints are often filled with caulk, but filling control joints cannot completely eliminate the tendency for debris to gather at the joints, cannot completely eliminate unsightly damage and wear to control joint edges, and does nothing to eliminate the control joints themselves.

Figure 2:
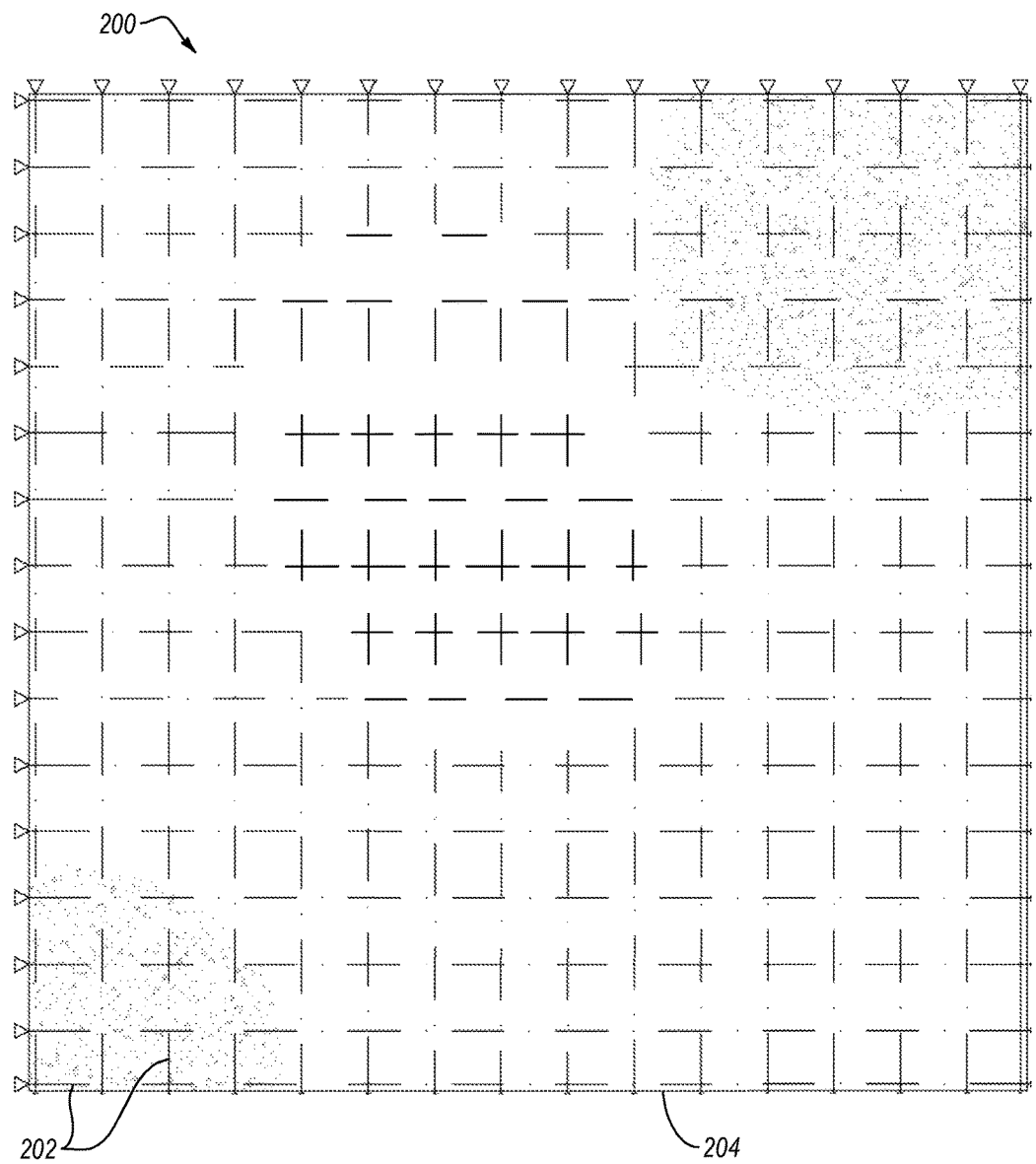
FIG. 2 illustrates a plan view of a joint-free concrete slab according to the present disclosure.

FIG. 2 illustrates a plan view of a joint-reduced or joint-free concrete slab 200 prepared according to an embodiment of the present disclosure. In the illustrated embodiment, the concrete slab 200 is formed using a low-shrinkage mix concrete. The concrete mix is preferably formulated to minimize cement content, maximize the size of large aggregate, contain evenly gradated aggregate, and have low slump. For example, the concrete mix can be formed using about 4 to about 7 bags of cement (e.g., about 94 pounds per bag), or about 376 to about 658 pounds of cement) per cubic yard of concrete, or about 5 to about 6 bags (or about 470 to about 564 pounds) of cement per cubic yard of concrete, or about 5.5 bags (or about 517 pounds) of cement per cubic yard of concrete. Additionally, or alternatively, the concrete mix can be, based on performance requirements, rated to have 28-day compressive strength (e.g., specified strength or actual strength) from about 2000 psi to about 6000 psi, or from about 2500 psi to about 3500 psi, or about 3000 psi.

The concrete mix also preferably includes a fiber component (e.g., steel, glass, polymers such as polypropylene and/or nylon, and/or natural fibers). The fiber component can be provided at a level that is from about 1 to about 4 times the level recommended as a rebar replacement (e.g., according to American Society for Testing and Materials (ASTM) standards, International Organization for Standardization (ISO) standards, and/or European Committee for Standardization (CEN) standards), or from about 1.5 to about 3 times the level recommended as a rebar replacement, or at about 2 times the level recommended as a rebar replacement.

The concrete mix also preferably includes aggregate having a maximum aggregate size of at least about 1 inch, preferably at least about 1.25 inch, and more preferably at least about 1.5 inches. Additionally, the concrete mix preferably includes well-gradated aggregates and includes at least two or more gradations of aggregate (e.g., inclusive of sand or other fine aggregate), more preferably at least three or more gradations of aggregate (inclusive of sand or other fine aggregate), and even more preferably at least four or more gradations of aggregate (inclusive of sand or other fine aggregate). The aggregate is preferably provided as angular aggregate or substantially mostly angular aggregate (e.g., angular aggregate obtained as crushed stone) rather than predominately rounded aggregates.

The concrete mix is preferably configured to have a slump prior to addition of admixture(s) of about 2 to about 6 inches, or about 3 to about 5 inches, or about 4 inches (as measured using a standard slump cone known in the art). After addition of superplasticizer and/or other admixture(s), in embodiments that use such, the concrete mix preferably has a slump of about 4 to about 8 inches, or about 4 to about 7 inches, or about 6 inches.

The concrete slab 200 also includes a plurality of post-tensioning cables ("PT cables") 202 arrayed in a grid formation throughout the concrete slab. The PT cables 202 are configured to engage the concrete slab during curing of the concrete slab and to aid and/or promote accelerated and controlled displacement of the concrete slab during concrete curing and shrinkage of the slab. For example, during curing of the concrete slab, portions of the slab will undergo tension as the slab experiences shrinkage forces pulling toward the center of the slab. The PT cables 202 can be configured to provide tension across the cables disposed through the slab, thereby providing compressive forces against the periphery 204 of the concrete slab and reducing, minimizing, or eliminating shrinkage-induced tension within the slab (e.g., through controlled inward contraction of the slab from the periphery). For example, the PT cables 202 can aid in accelerating the displacement of the slab in order to reduce or eliminate the buildup of crack-causing stress in the slab.

The PT cables 202 can have any desired tension rating, which can be proportional to the cable diameter and/or material used to make the cable. In some embodiments, the PT cables can have a diameter in a range of about 0.25 inch to about 1.5 inch, or about 0.375 inch to about 1.25 inch, or about 0.45 inch to about 1 inch, or about 0.5 inch to about 0.75 inch, or about 0.375 inch to about ¾ inch, or about 0.375 inch to about ⅝ inch, or about ⁷⁄₁₆ inch to about ⁹⁄₁₆ inch. The PT cables 202 can be made of any appropriate material, such as high strength steel, high strength alloy, or even non-metal cables (e.g., high tensile strength carbon fiber cables).

In an example embodiment, the PT cables 202 are arranged at 10 foot intervals in both planar directions to form the grid. In other embodiments, the spacing between PT cables 202 can be greater than about 10 feet or less than about 10 feet. In certain embodiments, the spacing between PT cables 202 along an edge/periphery 204 of the concrete slab can be inversely proportional to the length of the cables. For example, a plurality of PT cables passing through the concrete slab from one peripheral edge to an opposite peripheral edge can be spaced apart according to the distance between opposing peripheral edges. For example, where the distance between opposing peripheral edges is relatively longer, and a relatively greater mass of concrete must be moved and/or compressed by the operation of the PT cables 202, the number of PT cables 202 can be increased by reducing the spacing between PT cables 202 (e.g., by setting them at about 3 to about 8 feet apart, or at about 5 feet apart. Alternatively, when the distance between opposing peripheral edges is relatively shorter, the number of PT cables 202 can be decreased by increasing the spacing between PT cables 202 (e.g., to greater than about 10 feet or to greater than about 15 feet).

The illustrated concrete slab 200 is formed as a 6 inch concrete slab. In other embodiments, the thickness of the slab can be less than or greater than 6 inches. For example, the thickness can be any standard or non-standard thickness, such as about 4 to 5 inches, or about 5 to 6 inches, or about 6 to 8 inches, or about 8-10 inches. One of skill in the art will recognize that a thickness can depend on project requirements and/or needs, and that some thicknesses will be more beneficial to a given project (e.g., driveways, sidewalks, garage floors, industrial building floors, heavy equipment floors, floors for human traffic, home basement floors, etc.)

Some embodiments of methods for placing concrete floors include adjusting PT cables 202 to provide sufficient compressive force to the concrete slab during curing of the concrete slab 200 to reduce or eliminate cracking caused by internal shrinkage-induced tension (e.g., through controlled contraction of the slab). In some embodiments, the concrete slab is allowed to cure a sufficient time to achieve results of at least ⅓ of the rated design compressive strength of the concrete (e.g., about 1,000 psi compressive strength) in a standard break test, at which point the PT cables 202 can be mechanically tightened to approximately 50% of their maximum rated tension (e.g., about 16,500 pounds of tension for a 33,000 pound rated cable). This can facilitate movement of the concrete slab 200 proportional to the expected slab shrinkage as the curing process continues. The concrete slab 200 can be allowed to cure a sufficient time to achieve at least ⅔ of the rated design compressive strength of the concrete (e.g., about 2,000 psi) in a standard break test, at which point the PT cables 202 can be tightened to approximately 75% of their maximum rated tension (e.g., about 24,750 pounds) to facilitate further slab movement proportional to additional slab shrinkage. The concrete slab 200 can then be allowed to 2 a sufficient time to achieve about 100% of the rated design compressive strength of the concrete (e.g., about 3,000 psi) in a standard break test, at which point the PT cables 202 can be tightened to approximately 100% of their rated tension (e.g., about 33,000 pounds). The PT cables 202 can be further tightened to maintain the specified level of tension during as additional slab shrinkage causes changes to the tension of the PT cables 202.

In other embodiments, PT cable adjustment can be more or less frequent, and/or can be done at different times and/or according to different indicators. For example, adjustments to PT cables 202 can occur when the concrete has cured to about ¼, ½, ¾, and about 100% of the rated compressive strength of the concrete, or at about ⅙, ⅓, ½, ⅔, ⅚, and 100%, etc. In addition, the PT cables 202 can be tightened at different levels throughout the process. For example, the PT cables 202 can first be tightened to about 20% to 50% of their rated tension, and can be tightened at each interval by an amount suitable to bring the cables close to approximately 100% of their rated tension once the concrete has nearly cured to its full rated compressive strength (e.g., at least about 90% of the rated compressive strength). The strength measurements can also or alternatively include flexural strength.

Figure 3A:
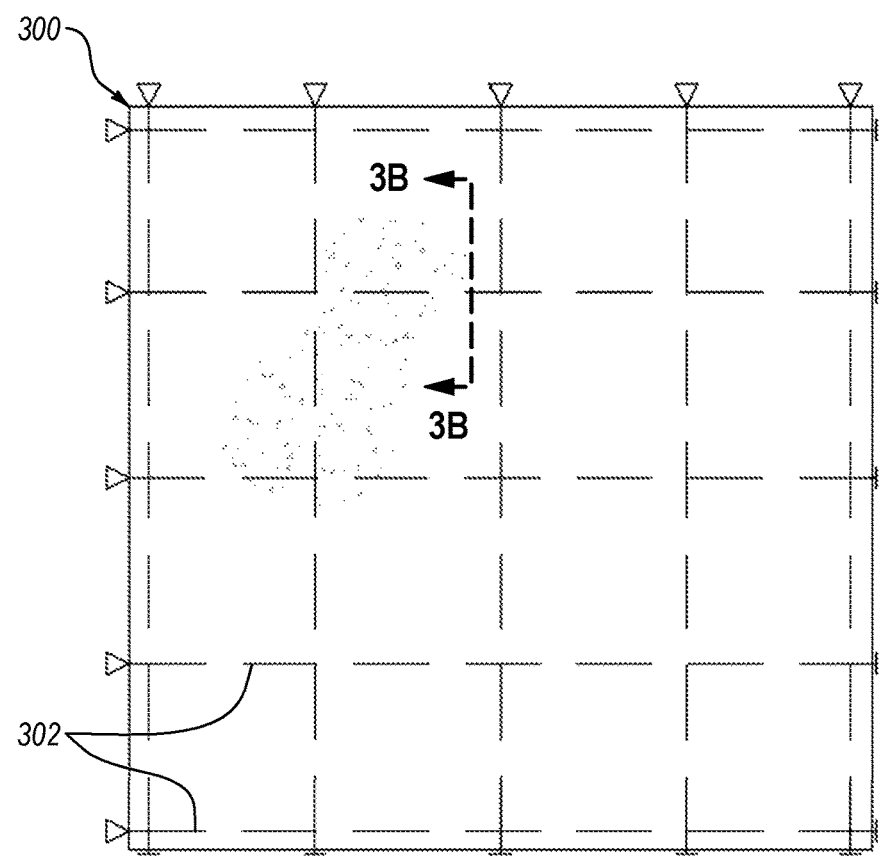
FIGS. 3A and 3B illustrate a plan view and cross-sectional side view, respectively, of a joint-free concrete slab on a prepared base.
Figure 3B:
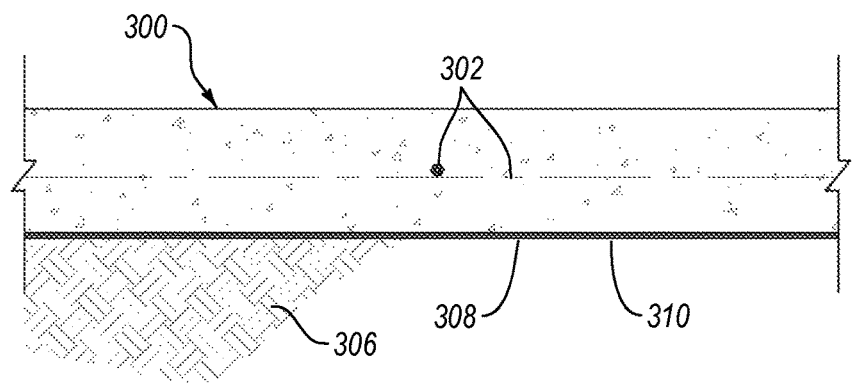

FIGS. 3A and 3B illustrate a plan view and cross-sectional side view, respectively, of another embodiment of a joint-reduced or joint-free concrete slab 300 prepared according to the present disclosure. The embodiment of FIGS. 3A and 3B can incorporate any of the features of the embodiment of FIG. 2. FIGS. 3A and 3B illustrate that the concrete slab 300 is preferably placed on top of a prepared base 306 having a smooth surface. The prepared base 306 can include various combinations of aggregate (e.g., sand, gravel, crushed rock) providing a suitable density and compactibility to support the concrete slab 300 without shifting and/or water pooling. In some embodiments, the prepared base 306 omits overly coarse aggregate (e.g., aggregate greater than ¾ inch, aggregate greater than ½ inch, and/or aggregate greater than ⅜ inch) in order to reduce protruding aggregates that diminish the flat and smooth surface of the prepared base 306.

In preferred embodiments, the prepared base 306 is graded to a flatness of ±1 inch over 10 feet, or ±¾ inch over 10 feet, or ±½ inch over 10 feet, or more preferably ±¼ inch or less over 10 feet (i.e., height differences of the base over a given 10 foot length are within the foregoing tolerances). The smooth and flat surface of the prepared base 306 provides advantages and benefits by reducing or eliminating projections and/or other surface features that tend to catch, snag, or promote friction against an overlaying concrete slab during movement of the concrete slab. For example, during shrinking (e.g., shrinking assisted using PT cables 302), the slab 300 is preferably free to shift, adjust, and move over the base as necessary, without hindrances that would increase internal tensile forces and concomitant cracking of the slab.

As illustrated in FIG. 3B, a vapor barrier 308 can be disposed between the prepared base 306 and the concrete slab 300. The vapor barrier 308 can be selected in any size suitable for a given project type (e.g., 10 mil, 15 mil, etc.). The vapor barrier 308 is preferably taped and/or otherwise sealed together as one contiguous piece in order to eliminate seams or other areas of potential passage of moisture. Additionally, one or more slip sheets 310 can be provided on top of the vapor barrier 308 between the vapor barrier 308 and the concrete slab 300. In preferred embodiments, at least one or two slip sheets 310 are included in addition to the vapor barrier 308 in order to provide reduced friction and enhanced promotion of movement of the concrete slab 300 during shrinkage and/or assisted shrinkage. Slip sheets 310 can be selected in any size suitable for a given project type (e.g., 4 mil, 6 mil, etc.). In some embodiments, one or more slip sheet(s) 310 are formed of a compressible material, such as a compressible foam material made from polyethylene, polypropylene, polyurethane, other suitable polymer, or combinations thereof. The compressible material may have a thickness of about 1/16 inch to about ¼ inch, or about ⅛ inch, for example, though other thicknesses may also be utilized according to application needs. A compressible slip sheet can beneficially smooth out any residual roughness or unevenness in the base. As an alternative to the illustrated embodiment, some embodiments may reverse the relative positions of the vapor barrier 308 and the slip sheet(s) 310. For example, a vapor barrier 308 may be placed above the one or more slip sheet(s) 310 and/or sandwiched between two or more slip sheets.

Figure 4:
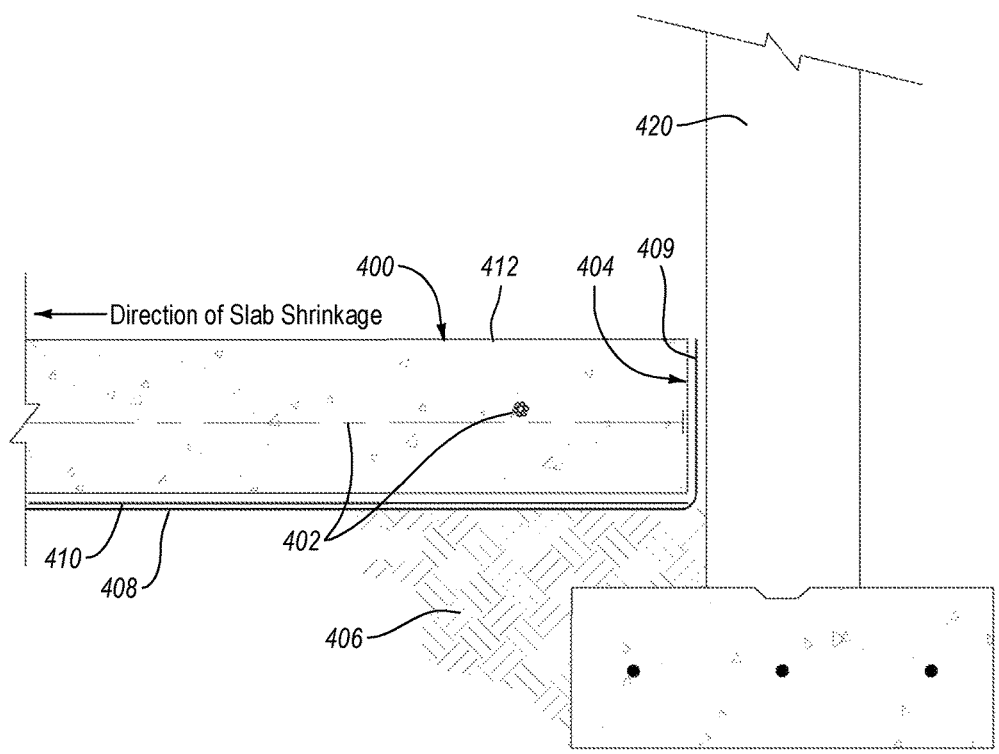
FIG. 4 illustrates a perimeter portion of a joint-free concrete slab.

FIG. 4 illustrates a preferred edge preparation according to one embodiment of the present disclosure. The embodiment of FIG. 4 can incorporate any of the elements of the embodiments shown in FIGS. 2 through 3B. As shown in FIG. 4, one or more slip sheets 410 can be extended to the periphery of the concrete slab 400, and the vapor barrier 408 can be extended to the periphery before turning upwards and extending, with vertical section 409, to the top surface 412 of the concrete slab 400, thereby contacting the side edge 404 of the concrete slab along the periphery of the concrete slab and separating the side edge 404 from the adjacent vertical structure 420 (e.g., concrete wall, masonry wall, or form).

Such embodiments provide a variety of advantages and benefits. For example, positioning the vapor barrier 408 along the side edge 404 of the slab can provide a seal on the edge 404 and can prevent unwanted bonds with the face of the structure 420. In addition, sealing the side edge 409 can reduce or eliminate hydration gradients that could otherwise result in water or water vapor leaving the concrete slab 400 along the side edge. Such activity can potentially result in uneven curing, and could result in curling and/or cracking at or near the periphery of the concrete slab 400.

Figure 5:
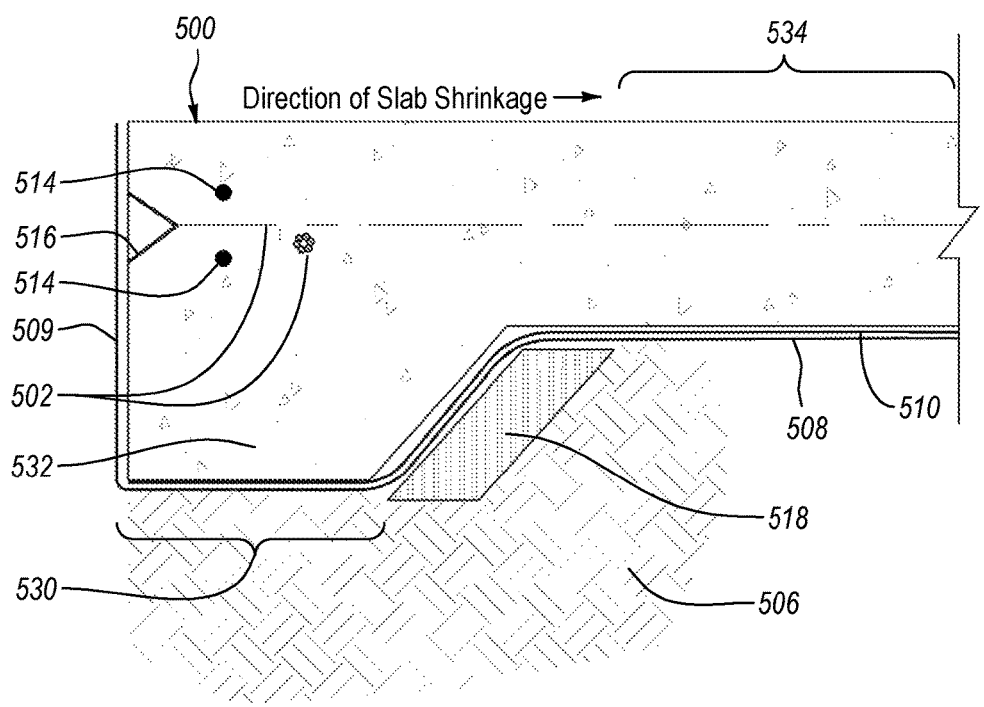
FIG. 5 illustrates another embodiment of a perimeter portion of a joint-free concrete slab including a thickened perimeter portion.

FIG. 5 illustrates another concrete slab 500 according to another embodiment of the present disclosure. As with other embodiments described herein, this embodiment can include a prepared base 506, vapor barrier 508, and one or more slip sheets 510. In this embodiment, the periphery section 530 of the concrete slab 500 has a thickness that is greater than the center portion 534 of the slab (e.g., greater by a factor of about 1.5 to 3, or about 2 to 2.5). Such embodiments can be advantageous by providing more mass and structure along the periphery in order to further prevent curling at the periphery of the slab. In such embodiments, the base 506 preferably has a compressible portion 518 adjacent to a transition section 532 of the concrete slab 500 where the thicker periphery section 530 transitions to the thinner center portion 534.

The compressible portion 518 is configured to allow movement of the lower portion of the periphery section 530 toward the center of the slab during shrinking. The compressible portion 518 of the prepared base 506 can be formed from a variety of materials capable of exhibiting compression. In some embodiments, the compressible portion is formed from the same aggregate materials that make up the prepared base, but has a lower level of compaction relative to the rest of the base. In other embodiments, the compressible portion can include a compressible foam or other compressible material.

FIG. 5 also illustrates that embodiments of the present disclosure can include tension dispersal elements 514 associated with a PT cable anchor 516. In the illustrated embodiment, the tension dispersal elements 514 are formed as rebar rods spaced approximately 2 to 36 inches horizontally away from the PT cable anchor 516 (e.g., about 6 to 36 inches away, or about 12 to 36 inches away, or about 18 to 30 inches away, or about 24 inches away). The tension dispersal elements 514 can have a length of about 1 to about 7 feet, or about 2 to about 5 feet, and are preferably centered on the PT cable anchor 516, with a first tension dispersal element being disposed above the PT cable 502 (in this view, the PT cable 502 extending from the periphery of the slab and toward the center) and a second tension dispersal element being disposed below the PT cable 502. In other embodiments, the tension dispersal elements 514 can be formed as other structures, such as blocks, boards, arcs, or other structures capable of distributing force from a PT cable 502 over a larger surface area. Additionally, or alternatively, some embodiments may include only one tension dispersal element, or may include more than two, and one or more of the tension dispersing elements may be positioned closer or further from the PT cable anchor 516.

Figure 6:
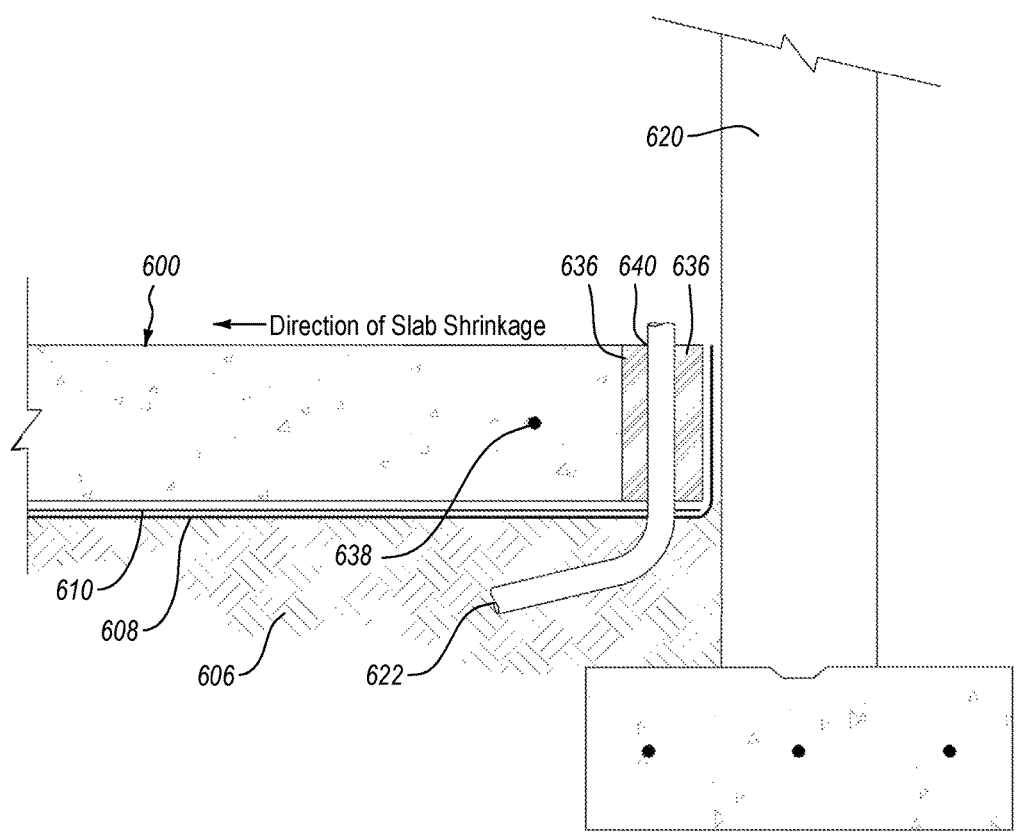
FIG. 6 illustrates a joint-free slab perimeter portion with an extension structure extending through the joint-free slab.

FIG. 6 illustrates another concrete slab 600 according to an embodiment of the present disclosure. As with other embodiments described herein, this embodiment can include a prepared base 606, vapor barrier 608, and one or more slip sheets 610. In the illustrated embodiment, a vertical extension 622 (e.g., conduit, pipe) extends through a passage 640 formed in the concrete slab 600 near the periphery of the concrete slab. FIG. 6 illustrates a conduit or pipe as a vertical extension 622; however, an extension can be any structure or member that is passed through the concrete slab 600 (e.g., plumbing or electrical pipes/conduits, posts, pillars, or other support structures, etc.). In other embodiments, an extension 622 may not be vertical; however, in preferred embodiments, any extensions in the concrete slab 600 are configured to be substantially vertical (i.e., extending substantially perpendicular relative to a plane defined by the slab 600). The passage 640 can be partially filled with a compressible material 636 configured to allow a degree of relative movement between the extension 622 and the concrete slab 600. The compressible material 636 can be formed from a variety of materials, including foams and/or sill sealers. In preferred embodiments, the compressible material 636 can also seal the side edges of the passage 640. As shown in FIG. 6, a reinforcing bar 638 can be positioned in the concrete slab 600 near the passage 640.

Figure 7:
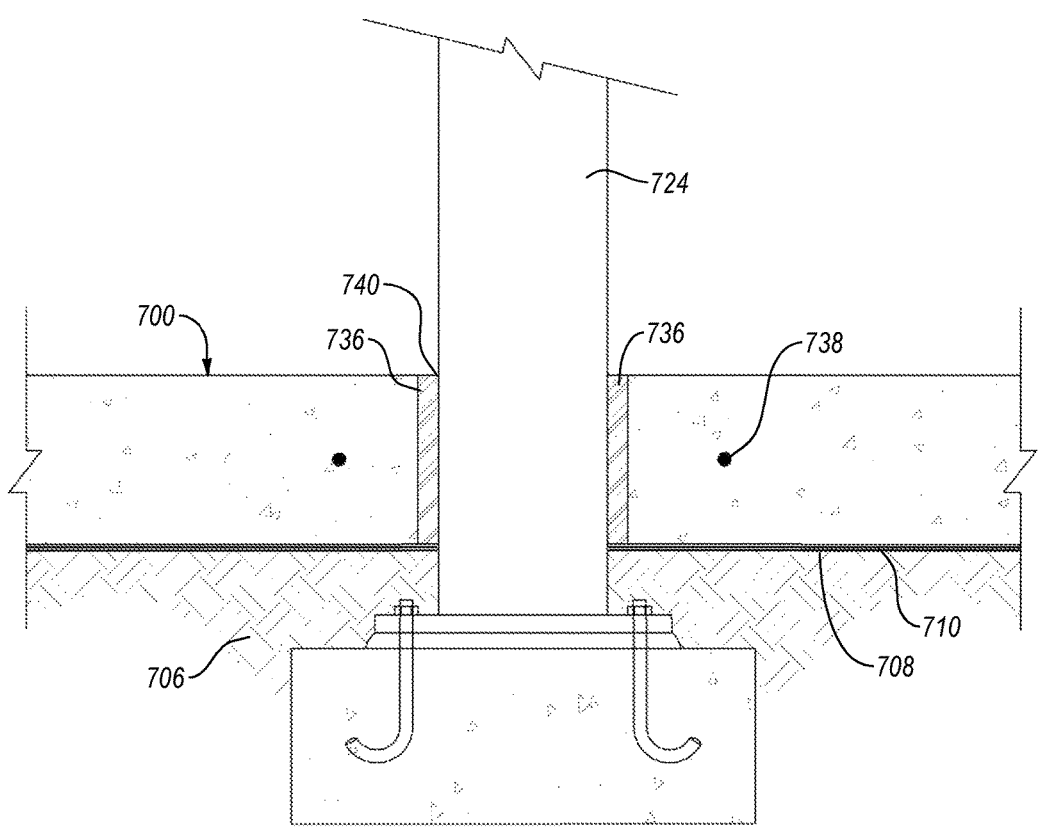
FIGS. 7 and 8 illustrate joint-free slabs with large extension structures extending through the joint-free slabs.

FIG. 7 illustrates another concrete slab 700 prepared according to an embodiment of the present disclosure. As with other embodiments described herein, this embodiment can include a prepared base 706, vapor barrier 708, and one or more slip sheets 710. As shown in FIG. 7, a large extension 724 (e.g., a structural component) extends through a passage 740 and is surrounded by a compressible material 736 to allow the slab 700 to move relative to the extension 724 without encountering resistance from the extension 724. In preferred embodiments, the compressible material 736 is configured with an uncompressed thickness that is about 1.25 to 3 times the anticipated amount of slab movement, or about 1.5 to 2 times anticipated amount of slab movement. FIG. 7 also illustrates a reinforcing bar 738 positioned around the passage 740 in order to provide additional support and reinforcement to the concrete slab 700 at the passageway. For example, an annular rebar ring can be positioned around a circular passageway to provide additional support and reinforcement to the concrete slab 700 at the passageway 740.

Figure 8:
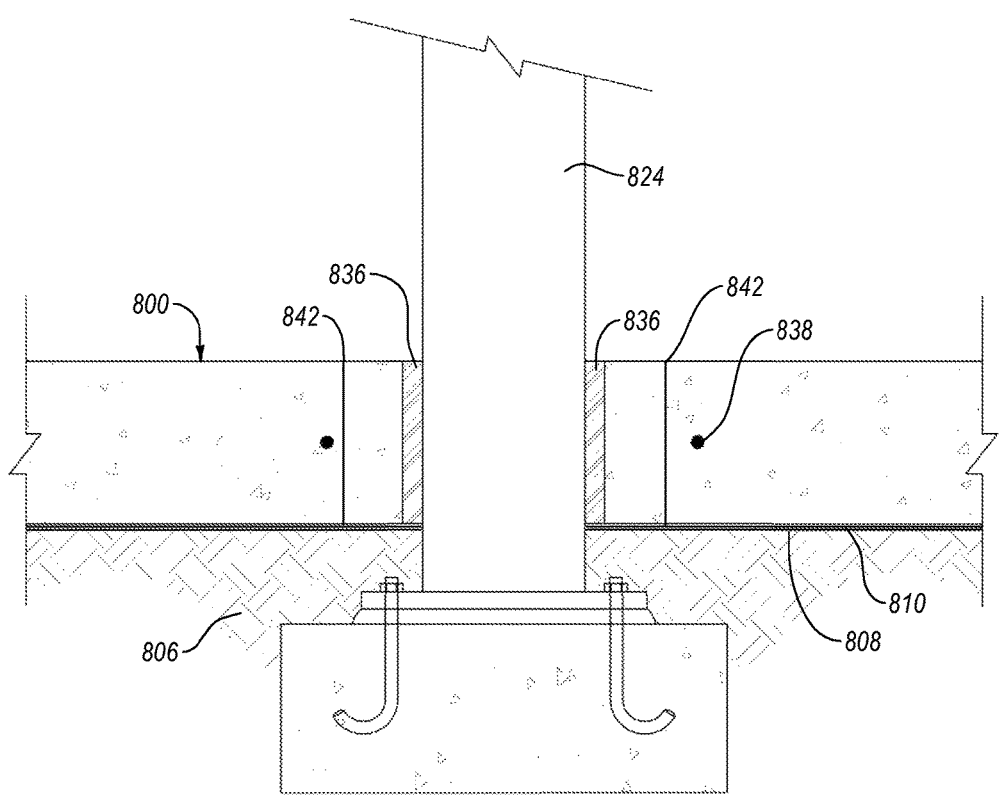

FIG. 8 illustrates another concrete slab 800 prepared according to an embodiment of the present disclosure. The embodiment illustrated FIG. 8 is similar to the embodiment illustrated in FIG. 7. In the embodiment illustrated in FIG. 8, a line or section of slab 842 may be cut to allow for the installation of additional structures after the concrete slab 800 has been placed. For example, a line of slab may be cut between a rebar support ring 838 and the compressible material 836 wrapping the slab extension 824 in order to allow for the installation of one or more columns, supports, or other structures.

Figure 9:
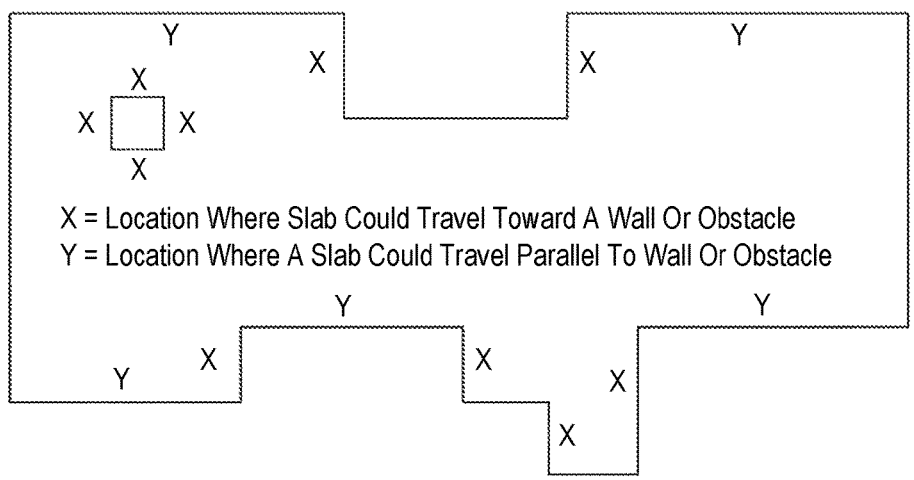
FIG. 9 illustrates a joint-free slab where slab shrinkage may be toward an obstruction and/or parallel to a wall or other structure.

At least some embodiments disclosed herein are useful where concrete slab shrinkage may be in the direction of an obstacle, such as a wall or other structure. For example, FIG. 9 illustrates a concrete slab 900 with an irregularly shaped periphery and with obstructing structures located inwards from the periphery. As the concrete slab 900 shrinks during curing, the direction of shrinkage may force portions of the concrete slab into contact with such walls and other obstructing structures (such as the locations illustrated by "X" in FIG. 9). The shape of the concrete slab 900 and/or the presence of obstructing structures can also result in some portions of the concrete slab moving against or parallel to walls and other structures as these portions move in the direction of shrinkage, such as at the locations illustrated by "Y" in FIG. 11).

Figure 10:
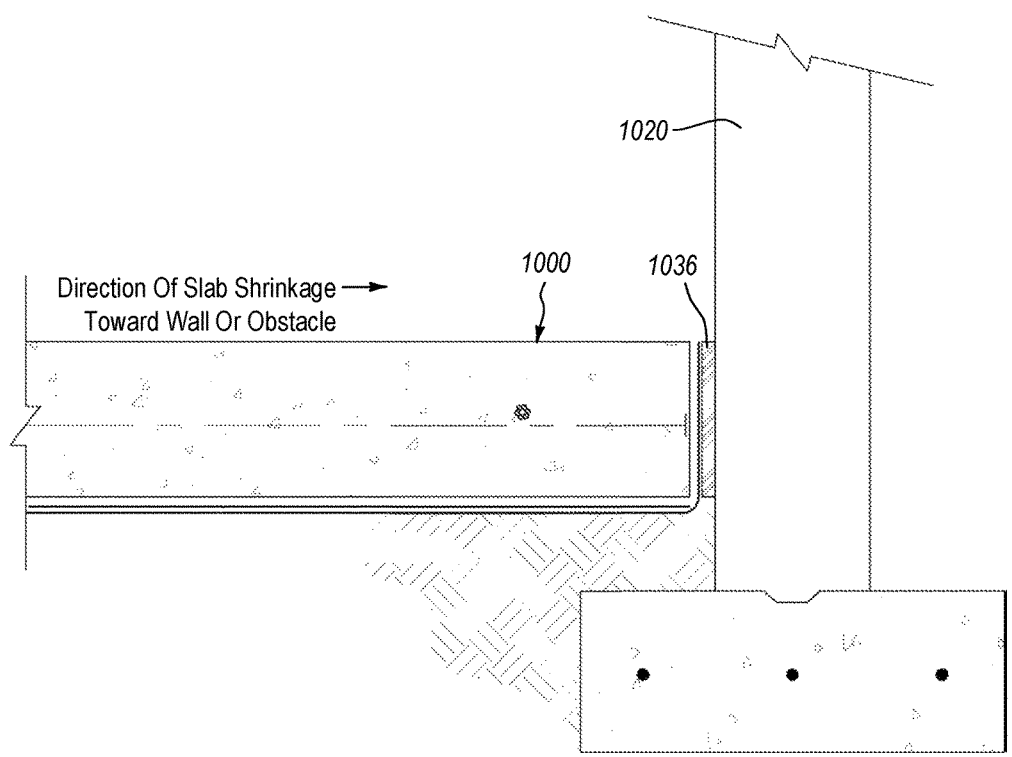
FIG. 10 illustrates a peripheral section of a joint-free slab showing slab shrinkage toward an obstruction.

As shown in FIG. 10, at such areas, a compressible material 1036 can be positioned between the edge of the concrete slab 1000 and the obstructing structure 1020 (e.g., wall) in order to allow the concrete slab to move in the direction of shrinkage without encountering resistance which could induce the formation of one or more cracks within the slab. As with other embodiments of compressible material, the compressible material 1036 can be configured to have an uncompressed thickness that is about 1.5 times the anticipated amount of slab movement (e.g., about 1.5 times the amount of anticipated compression of the material).

In circumstances where concrete slab shrinkage may be parallel to a wall or other structure, a compressible material can be positioned between the edge of the concrete slab and the wall or structure as in the embodiment shown in FIG. 10. Additionally, or alternatively, one or more slip sheets may extend vertically to position between the wall/structure and the edge of the slab, in order to allow the slab to move and slide against the wall/structure while minimizing resistance which could induce the formation of one or more cracks within the slab.

Embodiments of the present disclosure can result in placement of non-cracking concrete slabs having reduced or eliminated need for control joints. For example, non-cracking slabs can be formed with a continuous length of about 25 feet or more, or about 30 feet or more, or about 40 feet or more, or about 50 feet or more, or about 100 feet or more, or about 150 feet or more, or about 200 feet or more, or about 250 feet or more, or about 300 feet or more, or about 350 feet or more, or about 400 feet or more, or about 450 feet or more, or about 500 feet or more without interruption by one or more control joints. The "continuous length" of concrete slab without interruption by a control joint might be provided by a slab with no control joints along the length or other dimension in question (i.e., the entire slab extends from end to end in at least one dimension without any control joints). Alternatively, the "continuous length" of concrete slab without a control joints may be defined by the distance between an end of the slab and a control joint, or it may be defined by control joints at either end of the "continuous length".

The terms "approximately," "about," and "substantially," as used herein, represent an amount or condition close to the stated amount or condition that still performs a desired function or achieves a desired result. For example, the terms "approximately," "about," and "substantially" may refer to an amount that is within less than 10% of, within less than 1% of, within less than 0.1% of, and within less than 0.01% of a stated amount. In addition, unless expressly described otherwise, all amounts (e.g., temperature amounts, angle measurements, dimensions measurements, etc.) are to be interpreted as being "approximately," "about," and/or "substantially" the stated amount, regardless of whether the terms "approximately," "about," and/or "substantially."

Additionally, elements described in relation to any embodiment depicted and/or described herein may be combinable with elements described in relation to any other embodiment depicted and/or described herein. For example, any element described in relation to an embodiment depicted in FIGS. 2-5 may be combinable with an embodiment described in relation to FIGS. 6-10.

What is claimed is:

1. A concrete section having resistance to cracking, the concrete section comprising:
    a base comprising aggregate materials and having a substantially flat surface;
    a vapor barrier horizontally overlaying the base;
    one or more slip sheet horizontally overlaying the vapor barrier, wherein each slip sheet is a flexible polymer sheet; and
    a concrete slab horizontally overlaying and contacting at least one of the one or more slip sheets, the one or more slip sheets separating a bottom surface of the concrete slab from the vapor barrier so as to reduce friction caused by movement of the concrete slab during shrinkage or assisted shrinkage of the concrete slab,
    wherein at least a section of the concrete slab has a continuous length of at least 25 feet in at least one direction without interruption by a control joint, and
    wherein a portion of the vapor barrier at least partially covers a side edge of the concrete slab to limit passage of water or water vapor.

2. The concrete section of claim 1, wherein the base has a substantially flat surface of ±1 inch or less over 10 feet.

3. The concrete section of claim 1, wherein the concrete slab comprises cement and two or more gradations of aggregate, including a fine aggregate and at least one aggregate having a maximum aggregate size of at least 1 inch.

4. The concrete section of claim 3, wherein the concrete slab comprises three or more gradations of aggregate.

5. The concrete section of claim 3, wherein the concrete slab comprises four or more gradations of aggregate.

6. The concrete section of claim 3, wherein the concrete slab further comprises a fiber component.

7. The concrete section of claim 6, wherein the fiber component comprises one or more fibers selected from the group consisting of steel fibers, glass fibers, polymer fibers, and natural fibers.

8. The concrete section of claim 1, wherein the concrete slab further comprises a plurality of rebar rods embedded therein.

9. The concrete section of claim 1, wherein the concrete slab further comprises a plurality of post tension cables embedded therein.

10. The concrete section of claim 1, wherein the concrete slab has a continuous length in at least one direction without interruption by a control joint.

11. The concrete section of claim 1, wherein the concrete slab has a continuous length of at least 40 feet in at least one direction without interruption by a control joint.

12. The concrete section of claim 1, wherein the vapor barrier extends from a bottom surface of the concrete slab up the side edge to a top surface of the concrete slab to contact and seal the side edge of the concrete slab.

13. The concrete section of claim 1, wherein the slip sheet comprises polyethylene, polypropylene, or polyurethane.

14. The concrete section of claim 1, wherein the slip sheet is formed of a compressible polymer foam.

15. The concrete section of claim 14, wherein the slip sheet has a thickness up to ¼ inch.

16. A concrete section having resistance to cracking, the concrete section comprising:
    a base comprising aggregate materials and having a substantially flat surface;
    a plurality of barrier layers horizontally overlying the base, including at least one barrier layer comprising a compressible polymer foam having a thickness up to ¼, the plurality of barriers layers including at least one vapor barrier in contact with at least one slip sheet; and
    a concrete slab horizontally overlaying and contacting at least one of the barrier layers, wherein at least two vertically stacked barrier layers, including at least one vapor barrier and at least one slip sheet, are positioned between and separate the concrete slab from the base,
    wherein at least a section of the concrete slab has a continuous length of at least 25 feet in at least one direction without interruption by a control joint,
    wherein the concrete slab comprises cement and two or more gradations of aggregate, and
    wherein the concrete slab comprises a fiber component selected from the group consisting of steel fibers, glass fibers, polymer fibers, and natural fibers.

17. The concrete section of claim 16, wherein the two or more gradations of aggregate include a fine aggregate and at least one aggregate having a maximum aggregate size of at least 1 inch.

18. The concrete section of claim 16, wherein the one or more barrier layers comprise a vapor barrier overlaying the base and a slip sheet overlaying the vapor barrier, wherein a portion of the vapor barrier at least partially covers a side edge of the concrete slab to limit passage of water or water vapor.

19. A method for placing a concrete slab having resistance to cracking, the method comprising:
    preparing a base comprising aggregate materials, the base having a substantially flat surface;
    overlaying a plurality of barrier layers over the base, including placing a first barrier layer over and in contact with the base and thereafter placing a second barrier layer over in and contact with the first barrier layer;
    placing a fresh concrete mixture having a slump on top of and in contact with at least one of the barrier layers to form an initially uncured concrete slab; and
    allowing the concrete slab to cure to form a cured concrete slab, the concrete slab undergoing shrinkage while curing, the plurality of barrier layers cooperating to reduce friction and enhance movement of the concrete slab relative to the base during shrinkage and/or assisted shrinkage to reduce or eliminate cracking,
    wherein at least a section of the concrete slab has a continuous length of at least 25 feet in at least one direction without interruption by a control joint.

20. The method of claim 19, wherein the plurality of barrier layers includes a vapor barrier in contact with one or more slip sheets.

21. The method of claim 20, further comprising preparing a side edge along a periphery of the concrete slab by extending the vapor barrier from a bottom surface of the concrete slab up the side edge toward a top surface of the concrete slab to contact and seal the side edge of the concrete slab.

22. The method of claim 19, further comprising positioning a plurality of post-tensioning cables over the at least one slip sheet, placing the concrete mixture so that the post-tensioning cables extend through a length of the uncured concrete slab, and tensioning the cables one or more times during curing to compress the concrete along the length to reduce or eliminate cracking.

23. The method of claim 22, wherein the concrete slab is longer in a first dimension than in a second dimension, and wherein a plurality of post-tensioning cables spanning the first dimension are spaced apart at shorter intervals relative to a plurality of post-tensioning cables spanning the second dimension.

24. The method of claim 19, wherein overlaying the plurality of barrier layers over the base includes first placing a first slip sheet layer over and in contact with the base, next placing a vapor barrier layer over and in contact with the first slip sheet, and then placing a second slip sheet layer over and in contact with the vapor barrier layer.

* * * * *

UNITED STATES PATENT AND TRADEMARK OFFICE
CERTIFICATE OF CORRECTION

PATENT NO. : 10,352,044 B2
APPLICATION NO. : 15/912322
DATED : July 16, 2019
INVENTOR(S) : Daniel J. Pratt Page 1 of 1

It is certified that error appears in the above-identified patent and that said Letters Patent is hereby corrected as shown below:

In the Specification

Column 6
Line 46, change "to 2" to –to cure–

Column 9
Line 40, change "times anticipated" to –times the anticipated–
Line 62, remove [900]

Column 10
Line 6, change "Fig. 11" to –Fig. 9–
Line 46, change "control joints" to –control joint–
Line 62, after "substantially" insert --are used--

In the Claims

Column 11
Line 9, change "sheet" to –sheets–

Signed and Sealed this
Twenty-ninth Day of October, 2019

Andrei Iancu
*Director of the United States Patent and Trademark Office*